US006578140B1

(12) United States Patent
Policard

(10) Patent No.: US 6,578,140 B1
(45) Date of Patent: Jun. 10, 2003

(54) PERSONAL COMPUTER HAVING A MASTER COMPUTER SYSTEM AND AN INTERNET COMPUTER SYSTEM AND MONITORING A CONDITION OF SAID MASTER AND INTERNET COMPUTER SYSTEMS

(76) Inventor: Claude M Policard, 92-16 Whitney Ave., apt. #211, Elmont, NY (US) 11373

( * ) Notice: Subject to any disclaimer, the term of this patent is extended or adjusted under 35 U.S.C. 154(b) by 0 days.

(21) Appl. No.: 09/548,824

(22) Filed: Apr. 13, 2000

(51) Int. Cl.[7] .......................... G06F 12/14; G06F 11/30; G06F 15/177
(52) U.S. Cl. ..................... 713/1; 713/200; 709/224; 710/62
(58) Field of Search ................ 713/1, 2, 200, 713/201; 714/1, 2, 6, 8, 10, 11; 700/2–4; 709/208, 223, 224; 710/62, 8, 10

(56) References Cited

U.S. PATENT DOCUMENTS

| 4,747,040 A | | 5/1988 | Blanset |
| 5,535,399 A | | 7/1996 | Blitz et al. |
| 5,550,984 A | * | 8/1996 | Gelb ........................... 709/245 |
| 5,608,884 A | * | 3/1997 | Potter ......................... 710/124 |
| 5,680,536 A | * | 10/1997 | Tyuluman ...................... 714/1 |
| 5,802,297 A | | 9/1998 | Engpuist |
| 5,812,748 A | | 9/1998 | Ohran et al. |
| 5,848,230 A | | 12/1998 | Walker |
| 5,940,516 A | * | 8/1999 | Mason et al. ................ 713/159 |
| 6,067,618 A | * | 5/2000 | Weber ........................... 713/1 |
| 6,167,428 A | * | 12/2000 | Ellis ........................... 709/201 |
| 6,272,533 B1 | * | 8/2001 | Browne ........................ 709/213 |

FOREIGN PATENT DOCUMENTS

WO    WO 00/63778    * 10/2000

* cited by examiner

Primary Examiner—Jeffrey Gaffin
Assistant Examiner—Ilwoo Park
(74) Attorney, Agent, or Firm—Michael I. Kroll

(57) ABSTRACT

The invention is desktop computers sharing components and having divergent operating systems, hard drive(s) and memory for the expressed purpose of segregating the day to day data processing functions and files from access to the Internet and downloading information and e-mail therefrom.

11 Claims, 5 Drawing Sheets

PRIOR ART

PERSONAL COMPUTER HAVING A MASTER COMPUTER SYSTEM AND AN INTERNET COMPUTER SYSTEM AND MONITORING A CONDITION OF SAID MASTER AND INTERNET COMPUTER SYSTEMS

BACKGROUND OF THE INVENTION

1. Field of the Invention

The present invention relates generally to desktop computers and, more specifically, to desktop computers sharing components and having divergent operating systems, hard drive(s) and memory for the expressed purpose of segregating the day to day data processing functions and files from access to the Internet and downloading information and e-mail therefrom.

It is the scope of the present invention to incorporate the advantages of two systems without having two desktop computers. The desktop computer referred to in this application would be a computer having a case, power supply, motherboard, disk drive, disk drive interface, monitor, keyboard and can additionally include mouse, printer and cd-rom like devices.

2. Description of the Prior Art

There are other electronic device designed for segregated or backup data processing. Typical of these is U.S. Pat. No. 4,747,040 issued to Blanset on May 24, 1988.

Another patent was issued to Blitz et al. on Jul. 9, 1996 as U.S. Pat. No. 5,535,399. Yet another U.S. Pat. No. 5,802,297 was issued to Engquist on Sep. 1, 1998. Another patent was issued to Ohran et al. on Sep. 22, 1998 as U.S. Pat. No. 5,812,748 and still yet another was issued on Dec. 8, 1999 to Walker as U.S. Pat. No. 5,848,230.

U.S. Pat. No. 5,535,399

Inventor: Martin C. Blitz et al.

Issued: Jul. 9, 1996

Disclosed is a solid state disk drive, including a volatile, electronic RAM, memory and a non volatile, magnetic disk. The drive continuously saves unique data stored in the memory back to the disk. Additionally, the drive includes a number of tables and bit fields, in both volatile electronic memory and disk, for generally keeping track of what data has been restored from disk to memory, what data in the memory has been modified since it was restored from disk, and what modified data in the memory has been saved back to disk. In the event of a primary power outage, the drive first saves the volatile tables onto disk, and then saves the volatile, modified data onto disk, while using auxiliary power. If, however, auxiliary power is lost before any or all of the modified data is saved on disk, the saved tables provide information which enables the drive to distinguish the valid from the invalid data on disk.

U.S. Pat. No. 4,747,040

Inventor: David R. Blanset

Issued: May 24, 1988

The UNIX.RTM. and MS-DOS.RTM. operating systems are supported in a multi-tasking computer. At the heart of the computer is a microprocessor having protected and non-protected modes. The computer includes special-purpose hardware which prevents the MS-DOS system and its applications, which execute in the non-protected mode, from interfering with the UNIX system and its applications, which execute in the protected mode. In particular, this hardware monitors addresses generated by the computer and, by selectively inhibiting the associated control pulses, prevents the MS-DOS system from, for example, writing in UNIX-system-allocated memory, or accessing I/O devices that the UNIX system is currently using. In addition, a context switching feature is provided whereby the user can select, via a keyboard operation, to have displayed on the computer video monitor at any given time the image generated from the current UNIX system screen data or the image generated from the current MS-DOS system screen data.

U.S. Pat. No. 5,802,297

Inventor: James D. Engquist

Issued: Sep. 1, 1998

A cache only client-server configuration which provides the performance benefits of "dataless" client operation with the administrative efficiencies of a "diskless" client-server configuration. Utilizing cache only clients, the performance of stand-alone systems can be approximated utilizing a relatively small disk drive as a local data cache. The cache only clients may be considered as interchangeable units in that they hold no critical data and any data held on the local disk is a "clone" of the master copy held on the server. System configuration, administration and maintenance costs are dramatically reduced since software installation, distribution and backup may be managed at the server.

U.S. Pat. No. 5,812,748

Inventor: Richard S. Ohran

Issued: Sep. 22, 1998

A method for providing rapid recovery from a network file server failure through the use of a backup computer system. The backup computer system runs a special mass storage access program that communicates with a mass storage emulator program on the network file server, making the disks (or other mass storage devices) on the backup computer system appear like they were disks on the file server computer. By mirroring data by writing to both the mass storage of the file server and through the mass storage emulator and mass storage access program to the disks on the backup computer, a copy of the data on the file server computer is made. Optionally, selected portions of the data read through the mass storage emulator program can be altered before being returned as the result of the read operation on the file server. In the event of failure of the file server computer, the backup computer can replace the file server, using the copy of the file server's data stored on its disks. A single backup computer can support a plurality of file server computers. Unlike other redundant file server configurations, this method does not require the backup computer system to be running the file server operating system.

U.S. Pat. No. 5,848,230

Inventor: Mark S. Walker

Issued: Dec. 8, 1998

A highly reliable computer memory storage system that is divided into subsystems, each of which is provided in triplicate: a primary subsystem, a backup subsystem and a spare subsystem. Upon detection of a non-recoverable failure in a primary subsystem, the backup subsystem substantially immediately assumes the tasks of the primary subsystem while the spare subsystem is integrated into the operation of the computer memory storage system. The triple replication of all subsystems and mechanisms for detecting failures in at least the primary and secondary subsystems provides an overall memory system which is highly reliable and substantially never requires servicing. In an alternative embodiment, three subsystems can share a load equally, for example a cooling or power supply load requirement. Upon failure, of any one or two of such three redundant subsystems, the remaining subsystems(s) is built with sufficent extra capacity that remaining subsystem(s) can still supply the total power or cooling requirements of the system.

While these electronic devices may be suitable for the purposes for which they were designed, they would not be as suitable for the purposes of the present invention, as hereinafter described.

SUMMARY OF THE PRESENT INVENTION

With the advent of computers, data processing such as word processing, spreadsheets and graphic design were the mainstay of personal computer manufacturers and impetus for many people to invest in a PC. These machines proved to be more than adequate for these tasks and software developers were encouraged to expand the software capabilities of the personal computer, which was done with the addition of personal finance, interior design, landscaping and personal correspondence software, to name a few. All of this development was centered around faster processors, more disk space and bigger monitors.

With the advent of the Internet, the personal computer has transcended well beyond our wildest dreams. To the point that the government levies taxes on communications to provide Internet access to every public institution.

While the Internet is truly remarkable and for good or bad has become firmly intrenched in our culture, it has given rise to a subculture which expends a great effort in generating snippets of code, which when download into a personal computer can cause great harm to the contents therein. The present paranoia over the mischievous to malicious software, commonly referred to as computer virus, while effecting a relative small number of computers, has caused a regression in the exchange of information.

With the advent of e-mail this paranoia, either real or imagined, has reached pandemic proportion with the result that users are continuously warned to delete e-mail if they don't recognize the sender.

The problem is simply stated. Computers have become an integral part of our culture. More and more personal information is being committed within the typical household to electronic recording. Banking is online, motor vehicle registrations and license renewal is online, tax filing is online, college registration is online, shopping is online, etc. The need to secure and protect this information is obvious. It is also obvious that e-mail is here to stay and so are those users who generate virus software.

Although there are many organization that make a valiant effort to identify and remove the virus code, it is too late for those original victims.

Therefore, it is felt that there is a need to design a single desktop computer which segregates the data processing functions of the computer from the Internet function of the computer.

The present invention overcomes the aforementioned shortcomings of the personal computer by segregating Internet functions to separate internal devices that are normally written to and are subject to malicious code.

During the normal startup of a computer the bios is loaded into memory which then retrieves the system configuration and operating system from the hard drive which permits user to execute application software and establish communications with other computers through their Internet service provider.

The present invention provides two hard drives having two operating systems having segregated process and memory access, permitting users to toggle between these systems.

One system having Internet access having its own operating system, processor, memory and hard drive would share the computer components which can not be effect by malicious software, such as, the motherboard, drive controller, video card, monitor, keyboard, mouse, printers, scanners, etc.

The toggling between the two systems can be accomplished by a switch which can be incorporated into the PC case or by a third microprocessor using some keyboard key sequencing to switch between the systems.

The advantage of a third microprocessor with appropriate software is that it would monitor the state of both operating system. So that, if one crashed due to an application software bug, or a computer virus it would not effect the other because the other system's basic instruction set and stack would still be intact. Also, the third microprocessors software could reboot the affect system.

A primary object of the present invention is to provide a desktop computer having appropriate hardware and software to segregate application data processing from Internet communication functions.

Another object of the present invention is to provide a desktop computer which will boot two segregated operating systems.

Yet another object of the present invention is to provide a desktop computer having a microprocessor dedicated to each operating system.

Still yet another object of the present invention is to provide a desktop computer having dedicated memory for each operating system.

Another object of the present invention is to have one or more dedicated hard drives for each operating system.

Yet another object of the present invention is to provide a desktop computer having switch means for designating which operating system has control over system resources.

Still yet another object of the present invention is to provide a desktop computer having a third microprocessor with applicable software for controlling and monitoring the function of each operating system microprocessor.

Another object of the present invention is to provide a desktop computer having a KVM switch providing means for both operating system to share a common keyboard, video display device, and mouse pointing device.

Yet another object of the present invention is to provide a desktop computer having selective data transfer means for exchanging data between operating systems.

Still yet another object of the present invention is to provide a desktop computer which will enhance the worldwide exchange of data by reducing the impact of virus software on data processing applications.

Additional objects of the present invention will appear as the description proceeds.

The present invention overcomes the shortcomings of the prior art by providing a desktop computer having appropriate hardware and software to segregate application data processing from Internet communication functions.

The data processing system will boot two segregated operating systems each having a dedicated microprocessor, dedicated memory and one or more dedicated hard drives for each operating system. Also, the desktop computer has a KVM switch whereby both operating systems share a common keyboard, video display device, and mouse pointing device.

Further, the desktop computer provides a switch for designating which operating system has control over system resources.

Additionally, the desktop computer has a third microprocessor with applicable software for controlling and monitoring the function of each of the operating system and selective data transfer means for exchanging data between operating systems.

Still further, the desktop computer of the present invention will protect and preserve the privacy of personal computer users by removing sensitive information from Internet accessible areas of the computer and relegate the impact of malicious virus code to expendable data areas of the computer.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

LIST OF REFERENCE NUMERALS UTILIZED IN THE DRAWINGS 10 dual segregated operating system computer
12 first system board
14 second system board
16 mouse
18 monitor
20 keyboard
22 first single processor computer
24 second single processor computer
26 first case
28 second case
30 first processor system
32 second processor system
34 first cpu
36 first bios
38 first memory
40 static memory
42 isa, vlb, eisa, pci board slots
44 interprocessor bus
46 first disk drive
48 second disk drive
50 modem
52 second cpu
54 second bios
56 second memory
58 kvm switch
60 operating system
62 third microprocessor

BRIEF DESCRIPTION OF THE DRAWING FIGURES

In order that the invention may be more fully understood, it will now be described, by way of example, with reference to the accompanying drawing in which.

DETAILED DESCRIPTION OF THE PREFERRED EMBODIMENT

Figure 1:
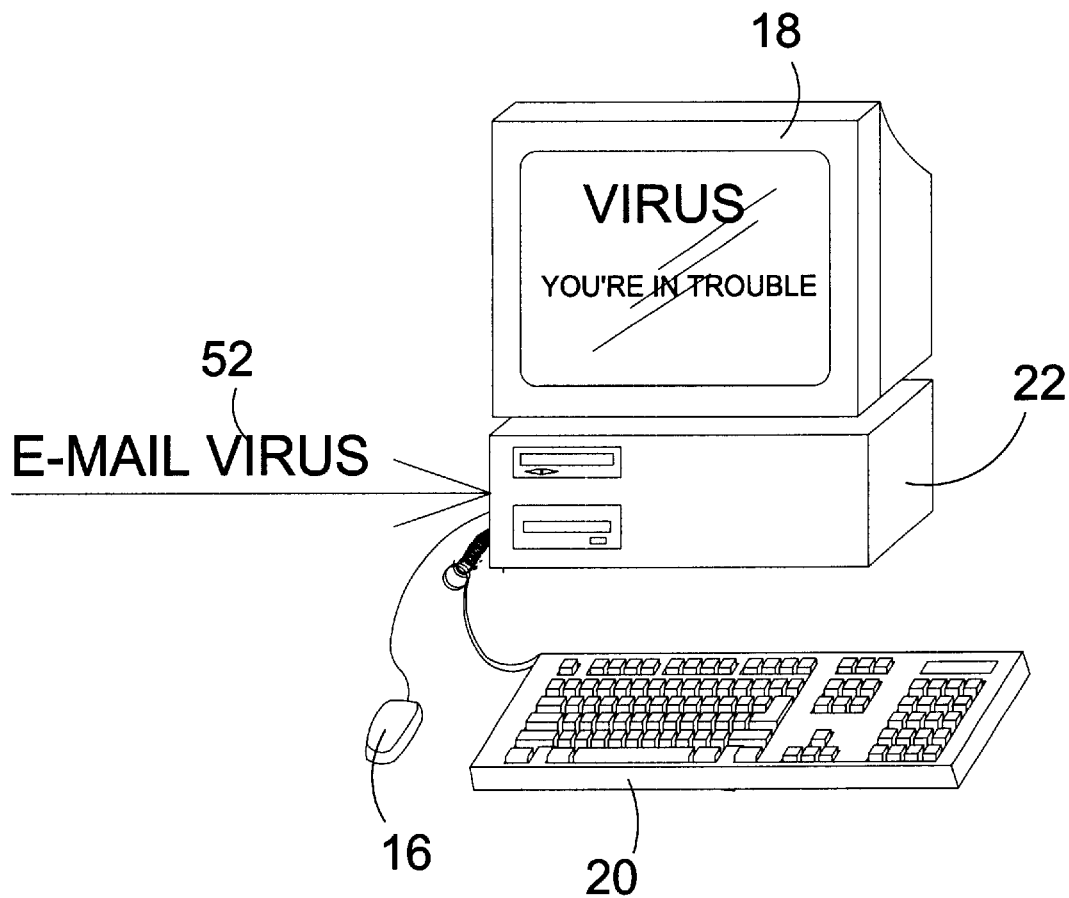
FIG. 1 is an illustrative view of a desktop computer of the prior art.

Turning now descriptively to the drawings in which similar reference characters denote similar elements throughout the drawing figures. FIG. 1 through FIG. 5 illustrate the dual segregated operating system of the present invention indicated generally by the numeral 10.

Figure 2:
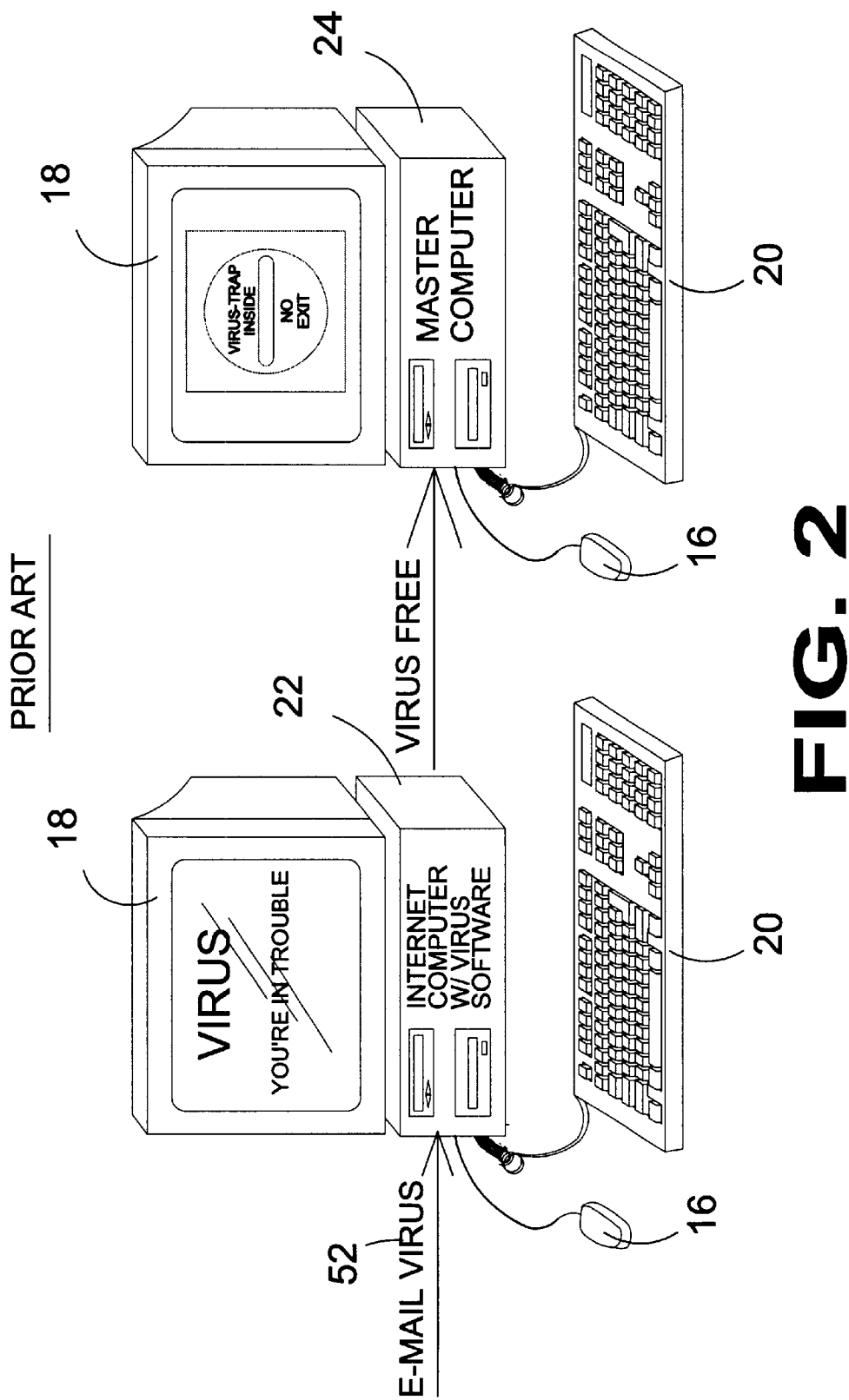
FIG. 2 is an illustrative view of the prior art showing dual desktop computers.
Figure 3:
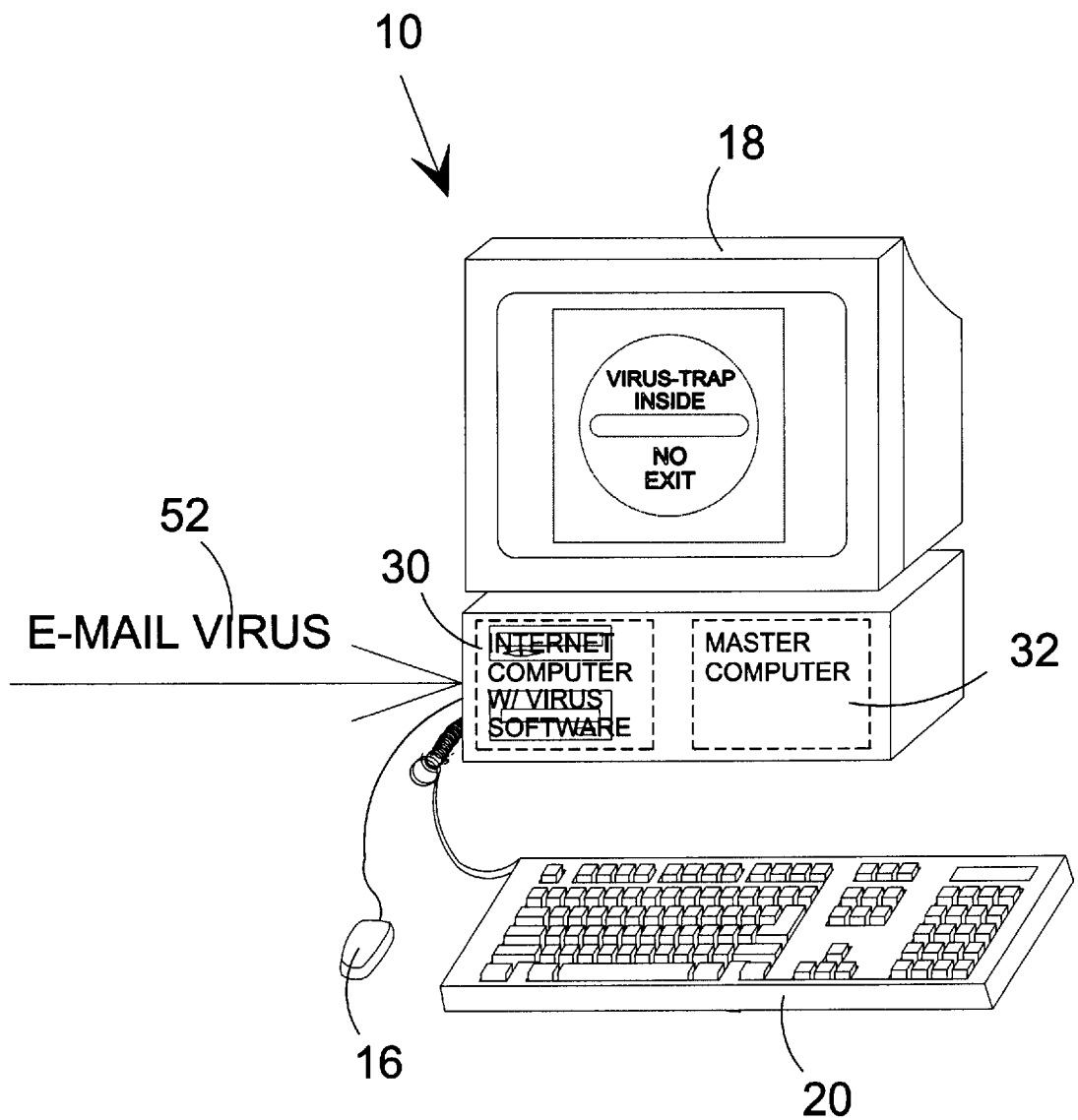
FIG. 3 is an illustrative view of the present invention.

Referring to FIG. 1, the single processor unit (22) of the prior art, having a monitor (18), keyboard (20) and, mouse (16) is commonly referred to as a personal computer and has typically a single microprocessor having a single operating system that loads a kernel of basic instruction in memory. The operating system uses the system resources to execute application software. Any e-mail which is read is loaded into memory or onto the disk drive. Once loaded into the system, unless identifiable by a virus detection program, the e-mail virus (52) is difficult to eliminate except by experienced systems personnel;

Referring to FIG. 2, the personal computer, as shown in FIG. 1 is typically comprised of a single processor unit (22), having a monitor (18), keyboard (20) and, mouse (16). One possible solution to prevent the e-mail virus (52) for destroying or disclosing confidential information unrelated to e-mail is to purchase a separate personal computer. The second single processor computer (24), could also have a redundant monitor (18), keyboard (20) and mouse (16). While this does work, it is cost prohibitive for most users;

Referring to FIG. 3, shows the personal computer of the present invention (10) having a single case housing a master computer system (32), and an Internet computer system (30) sharing a single monitor (18), single keyboard (20) and a single mouse (16). Since the separate internal system have their own operating system, the e-mail virus (52) would have no effect on the master computer system (32).

Figure 4:
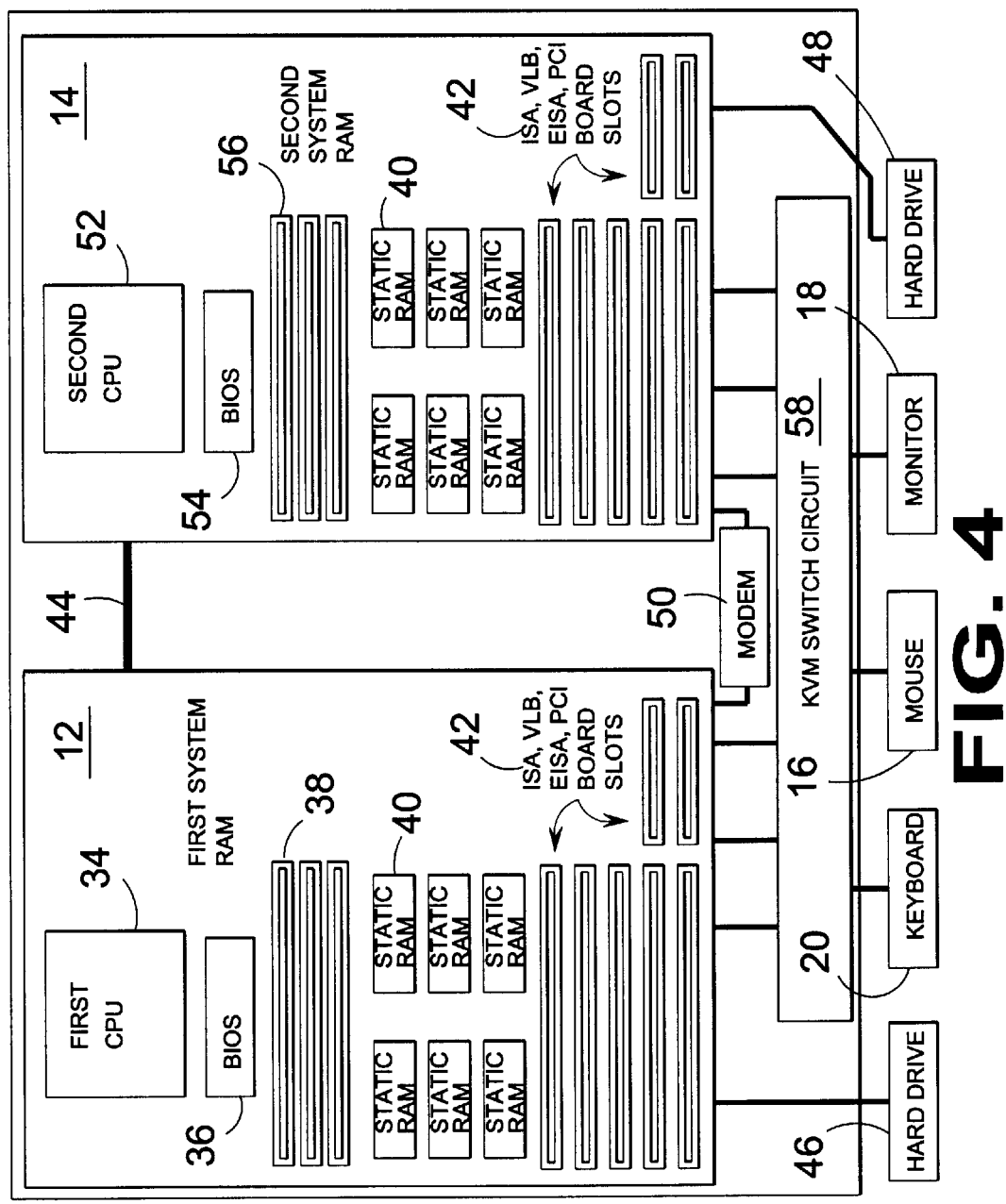
FIG. 4 is a diagrammatic view of one possible implementation of the present invention.

Referring to FIG. 4, shows the segregated system (10) of the present invention. A first processor system (30) has a first system board (12), first cpu (34) and first bios (36) which will be used as startup means for retrieving the operating system from a first disk drive (46). The first processor has one or more first memory chip(s) (38) and can additionally have it own static ram (40) and controller board slots for ISA, VLB, EISA, or PCI devices (42). A second processor system (32) has a second system board (14), second CPU (52) and second bios (54) which will be used as startup means for retrieving the operating system from a second disk drive (48). The second processor has one or more memory chip(s) (56) and can additionally have it's own static ram (40) and controller board slots for ISA, VLB, EISA, or PCI devices (42). There is also shown an inter-processor bus (44).

Both of the processor systems (30, 32) share a modem (50). In addition the processors share monitor (18), keyboard (20) and mouse (16) by means of KVM switch circuit (58). This configuration will allow for segregation of application data processing from Internet communication functions. The system will boot two segregated operating systems each having a dedicated microprocessor, dedicated memory and one or more dedicated hard drives for each operating system.

Figure 5:
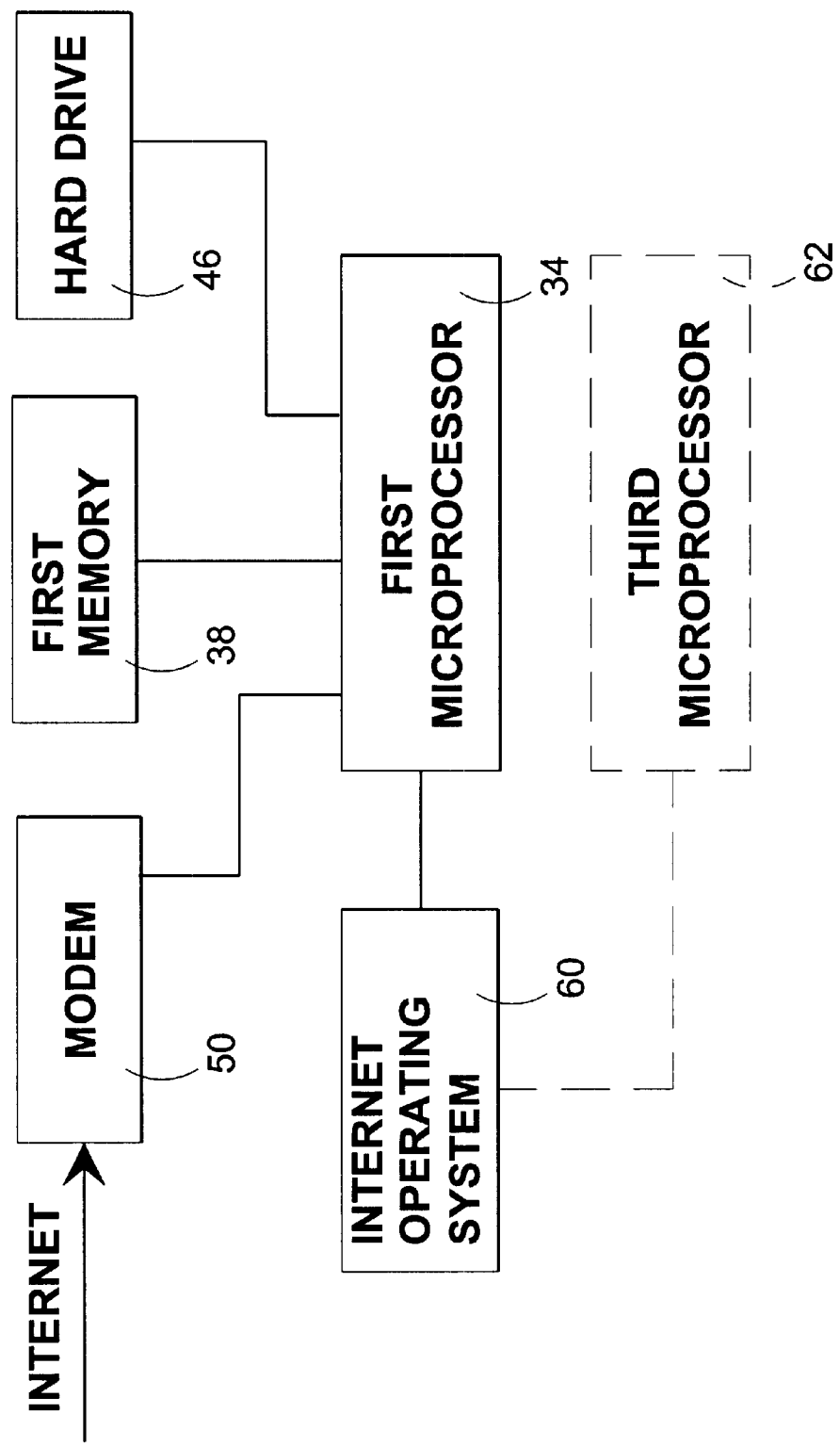
FIG. 5 is a block diagram showing the components of the Internet operating system. It should be noted that virus detection software could be resident with said system.

Referring to FIG. 5, the first computer system (30) has a modem (50) for connection to the Internet. The system further has a first memory (38) and first disk drive (46) and first microprocessor (34). The operating system (60) of the first processor system (30) has control of the dual processor system (10) while said first processor system (30) is browsing the Internet. Should the anti-virus software encounter an unknown virus, then the first cpu (34) and/or first memory (38) and/or first disk drive (46) will segregate the virus from infecting the second processor system (32).

In addition, a third microprocessor (62) could be incorporated into the dual segregated operating system computer to monitor the condition of both the first processor system (30) and second processor system (32).

What is claimed is new and desired to be protected by Letters Patent is set forth in the appended claims:

1. A dual processing system made up of a master computer system and an internet computer system within a single personal computer for segregating applications software from e-mail and internet downloaded files, the system comprising:
   a) means for storing a first bios and a first operating system in said master computer system;
   b) means in said personal computer for executing said first bios and said first operating system;
   c) means for storing a second bios and a second operating system in said internet computer system;
   d) means in said personal computer for executing said second bios and said second operating system, said means for storing and executing said first bios and first operating system being segregated from said means for storing and executing said second bios and second operating system to prevent contamination of applications software in said master computer system by a computer virus downloaded from the internet by said internet computer system;
   e) a single monitor, a keyboard and a mouse for use with both of said master and internet computer systems;
   f) means for toggling between the segregated master and internet computer systems comprising a KVM switch circuit; and
   g) means for monitoring a condition of said master and internet computer systems.

2. The system of claim 1, wherein said means for storing a first bios includes a first bios chip.

3. The system of claim 2, wherein said means for executing a first bios includes a first cpu.

4. The system of claim 3, wherein said means for storing a second bios includes a second bios chip.

5. The system of claim 4, wherein said means for executing a second bios includes a second cpu.

6. The system of claim 5, wherein said means for storing a first operating system includes a first disk drive.

7. The system of claim 6, wherein said means for executing a first operating system includes a first cpu.

8. The system of claim 7, wherein said means for storing a second operating system includes a second disk drive.

9. The system of claim 8, wherein said means for executing a second operating system includes a second cpu.

10. A personal computer containing a dual processing system for segregating applications software from e-mail and internet downloaded files comprising:
   a) a single case housing segregated master and internet computer systems, said systems being segregated to prevent contamination of applications software by a computer virus downloaded from the internet;
   b) said master computer system for processing and executing applications software comprising means for storing and executing a first bios, and means for storing and executing a first operating system including a dedicated microprocessor, memory and hard drive;
   c) said Internet computer system for downloading and processing files from the internet comprising means for storing and executing a second bios, and means for storing and executing a second operating system including a dedicated microprocessor, memory and hard drive; monitor, a keyboard and a mouse;
   e) means for toggling between the segregated master and internet computer systems comprising a KVM switch circuit; and
   f) means for monitoring a condition of said master and internet computer systems.

11. A method of preventing contamination of applications software by a computer virus from e-mail and internet downloaded files comprising the steps of:
   a) combining in said personal computer segregated master and internet computer systems, said master computer system comprising a first CPU, a first BIOS, a first hard drive and a first operating system, said internet computer system comprising a second CPU, a second BIOS, a second hard drive and a second operating system;
   b) connecting a monitor, a keyboard and a mouse for use with both of said master and internet computer systems;
   c) toggling between said master and internet computer systems using a KVM switch circuit for preventing the contamination of application software by a computer virus downloaded from the internet by said internet computer system; and
   d) monitoring by a third CPU a condition of said master and internet computer systems.

\* \* \* \* \*